United States Patent Office 3,257,281
Patented June 21, 1966

3,257,281
AEROSOL PREPARATIONS FOR THE TREATMENT OF THE HAIR COMPRISING HYDROPHILIC SALTS OF BASIC AMIDES AND ESTERS
Arthur Maeder, Therwil, Switzerland, assignor to Ciba Limited, Basel, Switzerland, a Swiss company
No Drawing. Original application July 5, 1962, Ser. No. 207,808. Divided and this application Oct. 3, 1963, Ser. No. 313,449
Claims priority, application Switzerland, Mar. 22, 1957, 44,156/57
14 Claims. (Cl. 167—87.1)

This application is divided out of my application Serial No. 207,808, filed July 5, 1962, which is a continuation in part of my applications Serial No. 721,683 and Serial No. 721,684 both filed March 17, 1958, and now both abandoned.

Copending application Serial No. 207,808 concerns water-soluble salts which are obtained by neutralization with an acid of basic linear additive copolymers containing a plurality of basic tertiary amino groups, which copolymers comprise copolymers from two, three or four monomers, at least one having a basic tertiary amino group and at least one other having a non-basic N-substituted amide group. Especially mentioned are water soluble salts of a copolymer consisting of polymerized units of (a) 5 to 60 percent by weight of N,N-dialkylaminoethylene- or -propyleneamides or N,N-dialkylaminoethylene- or -propylene esters of an acid of the acrylic acid series, of
(b) 30 to 75 percent by weight of a non-basic N-mono- or N,N-di-alkylsubstituted amide of an acid of the acrylic acid series, and
(c) 0 to 70 percent by weight of an ester of acrylic acid or methacrylic acid and an alkanol containing 2 to 12 carbon atoms.

The expression "an acid of the acrylic acid series" means $\alpha$:$\beta$-unsaturated carboxylic acids containing 3 to 5 carbon atoms and being the homologues of acrylic acid, namely methacrylic acid and crotonic acid, and the corresponding dicarboxylic acids, namely fumaric acid, maleic acid, itaconic acid and citraconic acid. The copolymers obtained from the components (a), (b) and (c) are polymers containing, additively combined in linear arrangement, recurring polymerized units which form an uninterrupted chain of carbon atoms.

More specifically, there is mentioned a water-soluble salt which is the neutralization product of a basic linear additive copolymer and an acid, which copolymer consists, for every 100 parts by weight, of (1) 5 to 60 parts by weight of polymerized units of a monomer selected from the group consisting of N-($\gamma$-diethylaminopropyl)-acrylic acid amide and N-($\beta$-diethylaminoethyl)-methacrylate, and of (2) 95 to 40 parts by weight of polymerized units of acrylic acid N-tertiary butylamide, and also a water-soluble salt which is the neutralization product of a basic linear additive terpolymer and an acid, which terpolymer consists, for every 100 parts by weight, of (1) 5 to 50 parts by weight of polymerized units of a basic monomer selected from the group consisting of N-($\gamma$-diethylaminopropyl)-acrylic acid amide, N-($\beta$-dimethylaminoethyl)-acrylic acid amine and N:N'-($\gamma$-dimethylaminopropyl)-fumaric acid diamide, of (2) 30 to 75 parts by weight of polymerized units of an N-substituted amide selected from the group consisting of acrylic acid N-tertiary butylamide, methacrylic acid N-tertiary butylamide, acrylic acid N-cyclohexylamide and acrylic acid N,N-di-n-butylamide, and of (3) 10 to 70 parts by weight of polymerized units of an ester of acrylic acid and an alkanol containing 2 to 12 carbon atoms.

This invention encompasses sprayable aerosol compositions for setting and lustering the hair by spray application, comprising (1) hydrophilic salts which are the neutralization products of the basic copolymers mentioned above, or of other basic copolymers of the same class i.e. containing the components (a) and (b), and of an acid, and/or (2) hydrophilic salts which are the quaternated products of the basic copolymers mentioned above, or of other basic copolymers of the same class, i.e. containing the components (a) and (b), and a quaternizing agent, and (3) an aliphatic low molecular water-soluble alcohol, a propellant and usual ingredients for hair-dressing compositions.

More specifically, the invention is an aerosol preparation for the treatment of the hair, comprising a hydrophilic salt of a basic copolymer in solution in a mixture of a water-soluble aliphatic monohydric alcohol containing 1 to 3 carbon atoms and a propellant of the group of fluorochloroalkanes, said basic copolymer being the product of the copolymerization of (a) A compound of the formula (1) 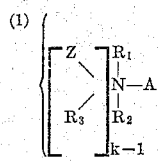 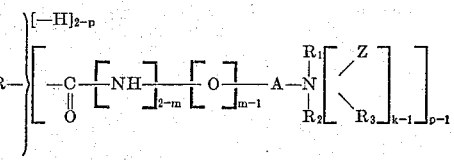

in which A represents an unsubstituted hydrocarbon radical which constitutes a bridge of two to six carbon atoms between the hetero atoms, R is the divalent monoethylenically unsaturated hydrocarbon radical of an acid selected from the group consisting of acrylic acid, methacrylic acid, crotonic acid, maleic acid and fumaric acid, $R_1$ and $R_2$ each represents a saturated alkyl radical containing 1 to 4 carbon atoms, $R_3$ represents the monovalent organic radical resulting from quaternization with a quaternizing agent selected from the group consisting of dimethylsulfate, ethylbromide, ethyliodide, benzylchloride, toluene sulfonic acid lower alkyl ester, epichlorhydrin, chloracetamide, N-methylol-chloracetamide and triethylphosphite, Z represents the anion resulting from said quaternizing agent, and $k$, $m$ and $p$ each represents a whole positive number of at most 2, and (b) An N-substituted acrylamide of the formula (2) 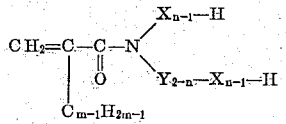

in which
X represents a divalent saturated hydrocarbon radical containing 1 to 8 carbon atoms,
Y represents a divalent saturated hydrocarbon radical which contains 3 to 10 carbon atoms, and
$m$ and $n$ each represents a positive whole number of at the most 2.

Preferably there is used a basic copolymerization product containing besides the components (a) and (b) components which are different from (a) and (b), i.e. which contain no tertiary amino group and no N-alkyl-substituted amide group.

The hydrocarbon radical A in Formula 1 contains 2–6 carbon atoms, and it may be aliphatic or carbocyclic. There may be mentioned, for example, the radicals

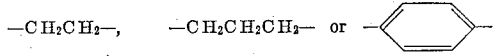

When $p=1$ there is present an amide or an ester of a monocarboxylic acid, and when $p=2$, it is a derivative of a dicarboxylic acid. When $k$ represents the number 1, the compound is a basic amide or ester of an aliphatic mono- or dicarboxylic acid which contains a tertiary amino group, and, when $k$ represents the whole number 2, the compounds contain a quaternary amino group. The organic radicals $R_1$ and $R_2$ are saturated aliphatic hydrocarbon radicals containing 1–4 carbon atoms, for example, the methyl, ethyl or propyl group. $R_1$ and $R_2$ jointly form a heterocyclic ring containing 5 to 6 atoms of which 1 to 2 are hetero atoms. The radical $R_3$ represents the monovalent organic radical of a quaternating agent. For example, in the case of dimethyl sulfate, $R_3$ represents the radical —$CH_3$ and, when epichlorhydrin is used $R_3$ represents the radical

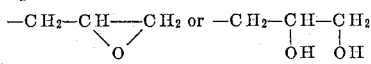

The anion Z is OH or a negative, salt-forming atom or radical and depends on the nature of the quaternating agent used.

The basic amides or esters are derived from an acid of the acrylic acid series, i.e. of an $\alpha{:}\beta$-unsaturated acid containing 3 to 5 carbon atoms such as crotonic acid, maleic acid, fumaric acid, $\alpha$-chloracrylic acid, methacrylic acid and especially acrylic acid. They contain, attached to the $\alpha{:}\beta$-unsaturated carbon double bond over a bridge of one heteroatom and one carbon atom, a tertiary amino group which is an N,N-dialkylamino hydrocarbon group, i.e. they contain the grouping (a) or (b)

(a)
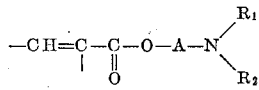

or (b)
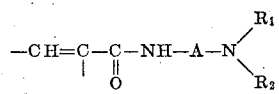

wherein $R_1$ and $R_2$ each is an alkyl group of 1 to 4 carbon atoms and A is a hydrocarbon radical of 2 to 6, preferably of 2 to 3 carbon atoms. For making the basic amides that are preferably used any diamines or polyamines containing at least two carbon atoms between the nitrogen atoms are suitable. There may be mentioned, for example, N':N'-diethyl-ethylene diamine, N':N'-diethyl-propylene diamine, and also polyalkylene polyamines, such as diethylene triamine, triethylene tetramine, tetraethylene pentamine, and also heterocyclic diamines such as monoalkyl-piperazines or aromatic diamines such as para-dimethylamino-aniline. There may also be used amines which contain an aliphatic hydrocarbon radical of high molecular weight, such as are obtained by the additive combination of a fatty amine with acrylonitrile followed by reduction. When the starting materials are such that primary or secondary amino groups are present in the amides, these groups may be converted into tertiary or quaternary groups, for example, by means of alkylating or aralkylating agents.

For making the basic esters which contain at least one tertiary amino group, there may be used any nitrogen bases which contain esterifiable hydroxyl groups bound through a bridge of at least two carbon atoms to the nitrogen atom, for example, the various known alkanolamines, such as dimethyl-ethanolamine, and also heterocyclic compounds such as oxyethyl-morpholine, and also aminophenols, for example, para-dimethyl-aminophenol. Among the basic esters there may be mentioned, for example, the $\beta$-dimethylaminoethyl ester of methacrylic acid. When the starting materials are such that primary or secondary amino groups are present in the esters, these groups may be converted into tertiary or quaternary groups, for example, by means of alkyalting or aralkylating agents.

Instead of the basic amides or esters in their free base state there may be polymerized the corresponding amine salts with acids, especially strong mineral acids such as sulfuric acid, nitric acid, hydrobromic acid and especially hydrochloric acid.

Examples of basic amides which may be used for the preparation of water-soluble salts of the basic copolymers containing tertiary amino groups or for the aerosol preparation containing hydrophilic salts according to Formula 1 are:

Acrylic acid-$\gamma$-diethylaminopropylamide (N-($\gamma$-diethylaminopropyl)-acrylamide),
Methacrylic acid-$\gamma$-dimethylaminopropylamide,
Acrylic acid-$\gamma$-di-(hydroxyethyl)-aminopropylamide,
Methacrylic acid-$\beta$-diethylaminoethylamide,
Acrylic acid-$\beta$-dimethylaminoethylamide,
Methacrylic acid-(4-dimethylaminocyclohexyl)-amide,
Acrylic acid-(4-dimethylaminophenyl)-amide,
Acrylic acid-$\beta$-N-morpholinoethylamide,
Acrylic acid-$\beta$-pyrrolidinoethylamide, and
Methacrylic acid-$\gamma$-piperidino propylamide.

Examples of suitable basic esters which may be used for the preparation of water-soluble salts of the basic copolymers containing tertiary amino groups or for the aerosol preparation containing hydrophilic salts according to Formula 1 are:

Methacrylic acid-$\beta$-diethylamino-ethyl ester (N-($\beta$-diethylaminoethyl)-methacrylate),
Acrylic acid-$\beta$-dimethylamino-ethyl ester,
Methacrylic acid-$\gamma$-diethylamino-propyl ester,
Acrylic acid-$\gamma$-di-(2-cyanoethyl)-aminopropyl ester,
Acrylic acid-$\gamma$-di-n-butylamino-propyl ester,
Acrylic acid-$\gamma$-diphenylamino-propyl ester and
Acrylic acid-(4-diethylaminophenyl)-ester.

The derivatives containing a quaternary ammonium group which are used as starting materials for the aerosol preparations, are obtainable from the corresponding basic amides or esters containing a tertiary amino group mentioned above by reaction with a compound capable of converting the tertiary amino group into a quaternary ammonium group. For this purpose there are advantageously used, for example, alkylating agents such as dimethyl sulfate, ethyl bromide or ethyl iodide, and also further aralkylating agents such a benzyl chloride and nuclear substitution products thereof, and also toluene sulfonic acid lower alkyl esters. In the case of salts of tertiary amines, alkylene oxides, such as ethylene oxide, may be used as quaternating agents. There are also used quaternating agents of this kind which also contain an atom grouping capable of taking part in cross-linking. As "atomic groupings capable of taking part in crosslinking," there are to be understood, for example, epoxy groups or N-methylolamide groups. As such quaternating agents there may be mentioned epichlorhydrin, chloracetamide and N-methylolchloracetamide.

Especially suitable basic amides or esters are, N-($\gamma$-diethylamino-propyl)-acrylic acid amide, N-($\beta$-dimethylaminoethyl)-acrylic acid amide and the corresponding methacrylamide derivatives, para-dimethylaminophenyl-acrylic acid amide, N:N'-di($\gamma$-dimethylaminopropyl)-fumaric acid diamide, N-($\beta$-diethylaminoethyl)-methacrylate and the corresponding -acrylate and -aminopropyl derivatives, N-($\beta$-dimethylaminoethyl)-methacrylate and the corresponding -acrylate and -aminopropyl derivatives, and (di-ethylaminoethyl)-fumaric acid ester.

The non-basic N-substituted amides which are copolymerized with the aforesaid basic amides or esters for preparing water-soluble salts thereof or aerosol preparation containing hydrophilic salts thereof are derived from an acid of the acrylic acid series, such as ethacrylic acid, methacrylic acid and especially acrylic acid. Especially suitable are N-substituted amides of the formula

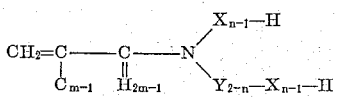

in which X represents a divalent saturated hydrocarbon radical such as an alkylene, cycloalkylene or arylene group which contains 1–8 carbon atoms and may contain substituents, Y represents a divalent saturated hydrocarbon radical which contains 3–10 carbon atoms and is preferably bound to the nitrogen atom by an at least secondary carbon atom, and in which $m$ and $n$ each represent a positive whole number of at the most 2. The grouping —X—H which may contain substituents is, for example, methyl, ethyl, n-butyl, $\beta$-hydroxyethyl, $\beta$-cyanoethyl, cyclohexyl or phenyl. As radicals —Y—H there may be mentioned n-propyl, isopropyl, n-butyl, tertiary butyl, 1:1:3:3-tetramethylbutyl or the bornyl radical. When $n=1$ the amide is monosubstituted and when $n=2$ it is disubstituted. When $m=1$, the compounds are derivatives of acrylic acid, and when $m=2$ they are derivatives of methacrylic acid. Among the N-monosubstituted compounds that are advantageously used there may be mentioned N-n-butyl-acrylic acid amide and those in which a secondary carbon atom is bound to the amide nitrogen atom, such as N-isopropyl-acrylic acid amide, N-cyclohexyl-acrylic acid amide, N-bornyl-acrylic acid amide and N-isobornyl-acrylic acid amide. There are advantageously used compounds in which a tertiary carbon atom is bound to the amide nitrogen atom, such as N-tertiary butyl-methacrylic acid amide, N-tertiary amyl-acrylic acid amide, N-phenyl-acrylic acid amide and especially N-tertiary butyl-acrylic acid amide.

Among the N-disubstituted compounds there may be mentioned N-diethyl-acrylic acid amide, N-di-isobutyl-acrylic acid amide, N-di-(2-ethyl-hexyl)-acrylic acid amide and N-diphenyl-acrylic acid amide.

If desired, further polymerizable compounds, apart from the aforesaid substituted acrylic acid amides, may be copolymerized with the aforesaid basic amides. As such polymerizable compounds there are used more especially compounds containing the atomic grouping

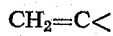

such as vinyl esters of organic acids, for example, vinyl acetate, vinyl formate, vinyl butyrate, vinyl benzoate, and also vinyl alkyl ketones, vinyl halides, such as vinyl chloride, vinyl fluoride, vinylidene chloride, vinylaryl compounds such as styrene and substituted styrenes, acrylonitrile, acrylamide and preferably esters of the acrylic acid series such as esters of acrylic acid with unsubstituted monohydric alcohols or phenols which contain 2 to 12 carbon atoms, for example, ethyl acrylate, butyl acrylate and dodecyl acrylate.

The term "water-soluble salts" means salts which are readily soluble in water to give a clear solution in a concentration of 1 to 20 percent by weight. In the case of the aerosol preparations the term "hydrophilic salt" encompasses salts obtained by neutralization with acids and salts obtained by quaternization, and the term means that the copolymers must be soluble, or at least swellable in water, so that they can be removed from the hair by a simple hair washing with a detergent. As acids with which the basic copolymers are neutralized to produce water-soluble salts there may be used hydrochloric acid, sulfuric acid, oxalic acid, and more advantageously weak acids having a dissociation constant smaller than $10^{-3}$, such as formic, acetic, phosphoric, carbonic, citric, lactic, fumaric, malonic, salicylic, tartaric, stearic, and valeric acid. In the case of the preparation of water-soluble salts there are preferred formic, acetic and carbonic acid, and in the case of aerosol preparations there are preferred lactic, stearic, phosphoric, citric and tartaric acid.

When polymers are prepared for use in hair-dressing aerosol preparations and an ester of acrylic acid or another ester, which is hydrolysable in polymerized form, of an acid of the acrylic acid series is used, it may be of advantage after the copolymerization, which is then advantageously carried out in a water-soluble solvent, especially a lower aliphatic alcohol, to hydrolyse sufficient ester groups to render the salt of the polymer hydrophilic.

This partial hydrolysis of ester groups that may be present in the copolymer is carried out by the usual methods. Advantageously the solution obtained by the polymerization is subjected directly to hydrolysis, advantageously with the use of an alkali metal hydroxide dissolved in alcohol. There is preferably used an alcoholic solution of caustic potash. The proportion of the hydrolysing agent to be used in order that the final product shall be soluble in water depends on the nature of the ester used and on the nature of any other polymerizable components that may be used. This can easily be determined by preliminary tests.

The proportions in which the starting components are used for making the polymers of this invention depend on the properties desired in the final products. Furthermore, it is understood that the proportions and the kind of the monomers must be so selected that the copolymers yield water-soluble salts, or salts or quaternated products which are at least swellable in water. Basic amides and basic esters, which contain a tertiary or quaternary amino group, naturally impart basic or cationactive properties and often also sticky or "soft" properties. The presence of structural elements which are derived from the non-basic N-substituted acrylic acid amides imparts consolidating or "hard" properties and copolymerization with the third component, especially esters of the acrylic acid series, imparts exclusively film-forming properties. An expert will therefore be able to select the relative proportions so as to obtain final products having the desired properties. Generally speaking there are used for every 100 parts by weight of the 2-component mixture 5–60 parts by weight, and advantageously 10–50 parts by weight, of the basic amide or basic ester and 95–40 parts by weight, and advantageously 90–50 parts by weight, of the non-basic N-substituted amide. When a 3-component mixture, i.e. a terpolymer, is used the proportions for every 100 parts by weight of the mixture are 5–50, and advantageously 10–40, parts by weight of the basic amide or basic ester, 30–75, and advantageously 40–60, parts by weight of the non-basic N-substituted amide, and 10–70, and advantageously 20–60, parts by weight of the third component.

The polymerization may be carried out in solution or in emulsion, and the techniques customary in industrial polymerizations are used. Thus, it is of advantage to use polymerization catalysts. The usual compounds that catalyse polymerizations may be used, such as $\alpha:\alpha'$-azo-isobutyrodinitrile and organic peroxides or per-salts, for example, peracetic acid, acetyl peroxide, benzoyl peroxide, benzoyl acetyl peroxide, lauryl peroxide, cumene hydroperoxide, tertiary butyl hydroperoxide, para-methane hydroperoxide, hydrogen peroxide, percarbonates, persulfates or perborates. The quantities in which the catalysts are added depends in known manner on the course of reaction desired or on the properties desired in the polymers. If desired, a plurality of catalytic agents may be used. The action of the polymerization catalysts may be enhanced by the simultaneous action of heat and/or actinic rays. It is indeed possible to carry out the polymerization only under the action of heat and/or actinic rays, that is to say without the addition of a catalytic compound. In order to modify the speed of reaction during the polymerization and the molecular weight of the polymer so-called regulators, for example, mercaptans, terpenes, etc. may be added.

Furthermore, it is of advantage to carry out the polymerization in the absence of air or oxygen and in the presence of an inert gas, such as nitrogen. It is also possible to use so-called activators, in addition to the above mentioned catalysts and regulators. Such activators are, for example, inorganic oxidizible oxygen-containing sulfur compounds, such as sulfur dioxide, sodium bisulfite, ammonium bisulfite, sodium hydrosulfite or sodium thiosulfate. By the simultaneous use of the aforesaid activators and oxygen-yielding polymerization catalysts so-called Redox systems are formed, which favour the polymerization process. As activators there may also be used water-soluble aliphatic tertiary amines, such as triethanolamine or diethyl-ethanolamine. It is also possible to accelerate the action of the polymerization catalyst by the addition of a heavy metal compound which is capable of existing in more than one valency stage and is present in a reduced condition, or by the addition of complex cyanides of iron, mercury, molybdenum, zinc, copper, silver or a mixture of two or more of these complexes.

The polymerization may be carried out at ordinary temperature, but it is preferable to carry out the polymerization at a raised temperature. Suitable temperatures are, for example, within the range of 40° C. to 95° C., and especially 55° C. to 90° C. Considerable amounts of heat are often liberated during the polymerizations, so that suitable cooling devices should be present in order to enable the desired polymerization temperature to be maintained. This is especially necessary when a large quantity of material is polymerized in one batch. In order to utilize the heat liberated and to control the polymerization temperature easily, it has been found advantageous in emulsion polymerization or solution polymerization, for example, to introduce into the polymerization vessel only a part of the emulsion to be treated and to initiate the polymerization in this part of the emulsion. When the emperature in this part of the emulsion or solution has reached a certain value, for example 60–70° C., the remainder of the cold emulsion may be run in in such manner that the temperature is kept constant. Towards the end of the polymerization it is often necessary to apply external heating.

When emulsion polymerization is used the monomeric compounds are advantageously emulsified with the use of an emulsifying agent. As emulsifying agents there may be used those of cation-active or non-ionic character. Among the cation-active emulsifying agents there may be used, for example, compounds of higher fatty amines with acetic acid, hydrochloric acid or sulfuric acid, such as octadecylamine acetate, (dodecyl)-diethylcyclohexylamine sulfate, or salts of diethylaminoethyl esters of higher fatty acids, or salts of the type of oleylamidoethyl-diethylamine acetate,

$C_{17}H_{33}CONHC_2H_4NH(C_2H_5)_2.OCOCH_3$

There may also be used quaternary ammonium compounds, such as cetyl-dimethyl-benzyl-ammonium chloride, cetyl-trimethyl-ammonium bromide, para-(trimethylammonium)-benzoic acid cetyl ester methosulfate, cetyl-pyridinium methosulfate, octadecyl-trimethyl-ammonium bromide or the quaternary compound of diethyl sulfate with triethanolamine tristearate.

Among the non-ionic emulsifying agents may be used polyglycol ethers of fatty acids of high molecular weight, fatty amines or fatty alcohols, such as cetyl alcohol, oleyl alcohol or octadecyl alcohol, for example, reaction products of 15–30 mols of ethylene oxide per mol of the fatty alcohol. There may also be used emulsifying agents having a pronounced wetting action, such as octyl-phenol polyglycol ether, lauryl alcohol polyglycol ether or a polyhydric alcohol partially esterified with a higher fatty acid, for example, glycerine monolaurate, or sorbitol monolaurate. There may also be used mixtures of such emulsifying agents, or mixtures of such emulsifying agents with protective colloids, such as polyvinyl alcohols, partially hydrolysed polyvinyl esters or starches or starch derivatives, for example, dextrin, and also cellulose ethers, polyethylene oxides and in general mixtures with water-soluble polymers or copolymers which contain free hydroxyl, amino or carboxylic acid amide groups. Finally, such protective colloids may be used alone.

When the polymerization is carried out in solution there may be used solvents in which the monomeric compounds are soluble but not the polymers. Alternatively, there may be used solvents in which both the monomers and the polymers are soluble. Suitable solvents are, for example, water or organic solvents, such as methylene chloride. It is especially advantageous to carry out the polymerization in a water-soluble solvent. As water-soluble solvents there may be used, more especially, aliphatic alcohols of low molecular weight, such as methyl alcohol, ethyl alcohol, propyl alcohol or isopropyl alcohol or a mixture of such alcohols. The polymerization is advantageously carried out by heating the mixture, advantageously to the boiling temperature of the solvent, and with the addition of a peroxidic catalyst which is soluble in the reaction medium, for example, lauryl peroxide or a mixture or lauryl peroxide and $\alpha:\alpha'$-azo-isobutyrodinitrile.

Depending on the nature of the polymerization conditions and of the starting materials, the polymeric compounds are obtained in the form of viscous solutions or emulsions.

The water-soluble salts of the basic copolymers can be used for a very wide variety of purposes. They are suitable above all in all cases where polymerization resins or polymerization resins and condensation resins are to be used. Provided that they have been made from suitable materials, the salts can be used as assistants in the textile, leather and paper industries. They can be used for making impregnation and coating compositions, for example, textiles of synthetic fibers, such as cellulose acetate artificial silk, polyamide fibers (nylon) or polyacrylonitrile fibers ("Orlon"), can be provided with an antistatic dressing with suitably substituted compounds. Various polymers are also suitable as after-treating agents for improving the fastness to washing and water of dyeings or prints on cellulosic textile materials produced with water-soluble direct dyeing dyestuffs, which owe their solubility in water to the presence of sulfonic acid or carboxylic acid groups. Such an after-treatment may be combined with a treatment with a copper salt.

Especially important is the use of the water-soluble salts as fixatives for the hair; for this purpose the salts are used in aqueous solution as a hair setting lotion. As a rule, the concentration of the water-soluble salts in aqueous solution is about 0.5 to 5 percent by weight. The solution is applied to the hair by the usual impregnation methods. The wet hair is set, dried and combed, and then retains its form. Each hair is wholly enveloped in a thin film of the preparation.

Otherwise, the hydrophilic products are used as hair fixatives in sprayable aerosol preparations. For this purpose they are either soluble in water or alcohol or in a mixture of water and alcohol. The swellability of the polymers is necessary to enable them to be easily removed from the hair. There have recently come into wide use a large number of preparations in the form of aerosol sprays. In this form of preparation the products are charged into a closed container under pressure together with a propellant of the group of fluoroalkanes which is gaseous at ordinary temperature. In use the product is sprayed in the form of very finely divided droplets when a valve on the container is opened, the droplets being formed due to evaporation of the halogenated hydrocarbon. In order that a product can be used in this manner it is necessary that it should be compatible with the propellant.

A polymer, which is to be used as a hair fixative in the form of an aerosol spray, must, on the one hand, be water-soluble or at least swellable in water and, on the other, it must be soluble in a lower aliphatic alcohol and in the propellant. The solution of the polymer must also dry to leave a glossy film having a good antistatic action, especially when the treated hair is subsequently combed.

In order to make aerosol spray preparations there are advantageously used polymer solutions which contain not more than 8–12% of polymer, and advantageously those containing about 10% of polymer. The original polymer solution may be diluted with the same alcohol as that used as solvent for the polymerization and hydrolysis. Alternatively, the desired concentration may be obtained by diluting with a different alcohol.

As the water-soluble saturated lower aliphatic alcohol which is a component of the aerosol preparations there is used a completely water-miscible, preferably monohydric, alcohol, having 1 to 3 carbon atoms, such as methanol, ethanol, propanol, and isopropanol. These alcohols act as coalescing agents (levelling agents) for the film-forming copolymer. They are also the carriers for perfumes and other substances usually employed in hair lacquers. The proportion of alcohol depends on the desired properties of the aerosol. A comparatively large proportion gives "wet" sprays, i.e. much alcohol evaporates on the hair. When too little alcohol is used, the copolymer may dry in small particles rather than forming a coherent film. As a rule, the aerosol sprays contain, per 100 parts by weight, about 20 to 70, preferably 30 to 40, parts by weight of the alcohol. The latter is advantageously used in substantially anhydrous form, either alone or in mixtures.

As propellants, which are a further component of aerosol preparations there are used the well-known compounds of the group of polyhalogenated hydrocarbons, especially fluorochloroalkanes. They are available under the trademark "Freon" (Du Pont). Particularly suitable are halogenmethanes, halogenethanes, and halogenpropanes, such as dichloro-difluoromethane ("Freon 12"), trichloromonofluoromethane ("Freon 11"), and the dichlorotetrafluoroethane ("Freon 114"). The selection of the propellant or propellant mixture depends mainly on the solvent properties of the alcohol and the desired pressure. With the aid of the data in "Aerosol Technical Serive No. 2," "Freon" of Du Pont, any expert can select the propellant and its quantity suitable for the desired spray properties. A mixture of equal parts of trichloromonofluoromethane and dichlorodifluoromethane has proved suitable, for example, for use in glass containers, whereas in the case of pressure vessels made of metal the proportion of the dichloro-difluoromethane may be increased to obtain a higher spray pressure. Ordinarily, the quantity of propellant is used which gives a gauge pressure of 1 to 4 atmospheres. As a rule, there are used per 100 parts of the aerosol composition, 30–80, preferably 50–70, parts by weight of the propellant or propellant mixture.

In making the hair fixative agent there may be incorporated with the polymer solution the additions customary in cosmetic preparations, such as softening agents, perfume, dyestuffs, agents imparting gloss or substances retarding evaporation. It is especially advantageous to add a silicone oil or silicone wax.

The following examples illustrate the invention, the parts and percentages being by weight unless otherwise stated, and the relationship of parts by weight to parts by volume being the same as that of the kilogram to the liter.

*Example 1*

One half of a mixture of 48 parts of ethyl acrylate, 36 parts of methyl methacrylate, 24 parts of tertiary butylacrylamide, 9.05 parts of N-($\gamma$-diethylaminopropyl)-acrylamide and 180 parts of isopropanol is heated to 70° C. in a stirring flask provided with reflux condenser and dropping funnel. As soon as the temperature remains constant, 0.2 part of lauroyl peroxide are added, and 10 minutes later the dropwise addition of the second half of the mixture described above is begun and is completed within 80 to 90 minutes. About 15 minutes after completion of the dropwise addition another 0.2 part of lauroyl peroxide are added. At intervals of two hours each four further additions of 0.2 part of lauroyl peroxide are made, and twice 0.2 part of $\alpha$:$\alpha'$-azoisobutyro-dinitrile are further added. When the last amount of catalyst has been added, polymerization is continued for 2 hours, and the mixture is then cooled to room temperature.

250 parts of the resin solution obtained in this manner are mixed with a solution of 3.25 parts of solid potassium hydroxide (of 86% strength) in 250 parts of isopropanol, and the whole is saponified for 3 hours at 80° C. under reflux with stirring. The mixture is cooled to 20–25° C., filtered and the filtrate is concentrated to a resin content of 50% by distilling off the solvent at a bath temperature of about 110° C. with stirring. The theoretical yield of 200 grams of concentrate is obtained.

The resin solution described above, concentrated to a dry content of 50%, is made into an aerosol hair spray thus:

5.2 parts of the resin solution of 50% strength described above are diluted with 20.4 parts of absolute ethanol and neutralized with 0.09 part of lactic acid of 100% strength. 0.03 part of a silicone oil (Antifoam A) in 0.27 part of monofluoro-trichloromethane as well as 0.15 part of perfume oil are added, and the solution is cooled to −5° to −10° C. 39 parts of a mixture of equal parts of monofluoro-trichloromethane and dichloro-difluoromethane are added and the mixture is charged into an aerosol dispenser provided with a special gastight valve for hair setting lotions.

A hair spray is obtained which imparts a very strong lustre to the hair, considerably reduces its charge of static electricity and is easy to comb without attendant dandruff formation. A normal wash will remove the setting lotion from the hair.

*Example 2*

A mixture of 72 parts of tertiary butylacrylamide, 36 parts of octadecylacrylamide, 9.05 parts of N-($\gamma$-diethylaminopropyl)-acrylamide and 180 parts of isopropanol is divided into two equal portions as described in Example 1 and heated to 70° C. As soon as a constant temperature has been reached, 0.2 part of lauroyl peroxide are added, and 10 minutes later the dropwise addition of the second half of the mixture described above is begun and completed within 80 to 90 minutes. About 10 minutes after completion of the dropwise addition 0.2 part of lauroyl peroxide are added and then at intervals of 2 hours each four further additions of 0.2 part of lauroyl peroxide are made. 2 hours after the addition of the last amount of catalyst the mixture is cooled to room temperature.

285 parts of a thinly viscous solution are obtained having a dry content of about 40%. The yield of polymer is 97% of the theoretical.

The solution obtained in this manner is made up into an aerosol hair spray thus:

5 parts of the resin solution of 40% strength described above are treated with 0.1 part of perfume oil and 0.2 part of silicone oil (marketed by Dow Corning Corporation of Midland, Michigan, under the trademark "Antifoam A"), then diluted with 14.76 parts of isopropanol and neutralized with 0.24 part of stearic acid. The solution is cooled to −5° to −10° C., and 30 parts of a mixture of equal parts of monofluoro-trichloromethane and dichloro-difluoromethane are added. This mixture is charged into an aerosol dispenser provided with a special gastight valve for hair setting lotions. Hair sprayed with this aerosol preparation is well set and has a strong lustre. The sprayed hair is easy to dress and no longer has a charge of static electricity.

Example 3

One half of a mixture of 48 parts of ethylacrylate, 60 parts of tertiary butylacrylamide, 12 parts of N-(γ-diethylaminopropyl)-acrylamide and 180 parts of absolute ethanol is heated to 73° C. as described in Example 1. As soon as a constant temperature has been reached, 0.1 part each of lauroyl peroxide and α:α′-azoisobutyro-dinitrile are added and 10 minutes later the dropwise addition is begun of the second half of the mixture described above, being completed within 90 to 100 minutes. About 10 minutes after the completion of the dropwise addition 0.1 part each of lauroyl peroxide and α:α′-azoisobutyrodinitrile are added and at intervals of 2 hours each another four additions of 0.1 part each of lauroyl peroxide and α:α′-azoisobutyrodinitrile are made. 2 hours after the last addition of catalyst the mixture is stirred until cold. 300 parts of a thinly viscous solution are obtained having a dry content of about 40%. The yield of polymer amounts to 99–100% of the theoretical. The resin of this preparation is completely insoluble in water. In order to produce a water-soluble salt, the basic polymer is precipitated by addition of ice-cold water and the precipitate is filtered off. The polymer is introduced into water, and the calculated amount of acetic acid is added, whereby the product is clearly dissolved. Hair is impregnated with an aqueous solution of the acetate salt of one percent strength. The wet hair is set, dried and combed. It then retains its form also in a humid atmosphere.

The solution of the basic, non-neutralized copolymer is made up into an aerosol hair spray thus:

5 parts of the resin solution of 40% strength described above are diluted with 14.9 parts of (absolute) ethanol and neutralized with 0.1 part of lactic acid of 100% strength. The solution is cooled to −5° to −10° C., 30 parts of a mixture of equal parts of monofluoro-trichloromethane and dichloro-difluoromethane are added, and the mixture is charged in an aerosol dispenser provided with a special gastight valve for hair setting lotions. In this manner an aerosol hair spray is obtained which imparts a fine lustre to hair on which it has been sprayed and allowed to dry. Water will swell but not dissolve this resin film.

Example 4

One half of a mixture of 36 parts of ethylacrylate, 60 parts of tertiary butylacrylamide, 24 parts of N-(γ-diethylaminopropyl)-acrylamide and 180 parts of absolute ethanol is heated to 75° C. as described in Example 1. When a constant temperature has been reached, 0.1 part each of lauroyl peroxide and α:α′-azoisobutyro-dinitrile are added, and 10 minutes later the dropwise addition of the second half of the mixture described above is begun, which takes 90 to 100 minutes. On completion of the dropwise addition 0.1 part each of lauroyl peroxide and α:α′-azoisobutyro-dinitrile are added and at intervals of 2 hours each another four additions are made of 0.1 part each of lauroyl peroxide and α:α′-azoisobutyro dinitrile. 2 hours after the completion of the catalyst addition the mixture is cooled to room temperature. 300 parts of a thinly viscous solution are obtained having a dry content of about 40%. The yield of polymer is about 99–100% of the theoretical. The resin is insoluble in water, but readily soluble in the form of the acetate salt. The solution of the acetate can be used as hair setting lotion in the same way as described in Example 3.

The solution of the basic, non-neutralized resin is made up into an aerosol hair spray thus:

5 parts of the resin solution of 40% strength described above are diluted with 14.8 parts of absolute ethanol and neutralized with 0.2 part of lactic acid of 100% strength. This solution is cooled to −5° to −10° C., 30 parts of a mixture of equal parts of monofluoro-trichloromethane and dichloro-difluoromethane are added, and the whole is charged into an aerosol dispenser provided with a special valve for hair setting lotions. Hair sprayed with this aerosol hair setting lotion has a fine lustre, is easy to dress and no longer displays the unpleasant effects of a charge of static electricity. The lotion is easy and simple to wash out of the hair.

Example 5

By using a mixture of 36 parts of acrylonitrile, 30 parts of tertiary butylmethacrylamide, 30 parts of dodecylacrylate, 24 parts of N-(β-dimethylaminoethyl)acrylamide and 180 parts of absolute ethanol—instead of the mixture described in Example 4—otherwise proceeding as described in Example 4, 300 parts of a similar resin solution are obtained which can likewise be transformed into the water-soluble acetate salt or be made up into a hair setting lotion by adding 0.25 part of lactic acid of 100% strength thereto.

Example 6

A mixture of 32.95 parts of diethylaminopropyl crotonamide quaternated with chloracetamide, 32.95 parts of cyclohexyl-acrylamide, 32.95 parts of symmetrical dichloroethane, 65 parts of absolute ethanol and 95 parts of benzene is heated in a stirring flask fitted with reflux condenser and thermometer to an internal temperature of 75° C., whereupon 0.06 part each of benzoyl peroxide and α:α′-azoisobutyro-dinitrile are added. At intervals of 2 hours each another four additions of 0.06 part each of benzoyl peroxide and α:α′-azoisobutyro-dinitrile are made, and 2 hours after the last catalyst addition the mixture is cooled to room temperature.

A thinly viscous solution of orange red color is obtained. On addition of water thereto the resin precipitates immediately. The yield of polymer is substantially quantitative, the dry content being about 26 to 27%.

8 parts of the solution described above are diluted with 12 parts of absolute ethanol and cooled to −5° to −10° C. This solution is charged into an aerosol dispenser; 30 parts of a mixture of equal parts of monofluoro-trichloromethane and dichloro-difluoromethane are added, and the dispenser is closed with a special valve for hair setting lotions.

The aerosol spray obtained in this manner can be used for setting the hair.

Example 7

30 parts of (di-dimethylaminopropyl)-fumaric acid diamide are dissolved in 150 parts of absolute ethanol and 15 parts of distilled water and neutralized with 5.17 parts of phosphoric acid of 100% strength at room temperature. 30 parts of cyclohexyl-acrylamide and 40 parts of n-butylacrylate are added to this solution and the mixture is heated in a stirring flask fitted with reflux condenser and thermometer to an internal temperature of about 75° C., and in a current of nitrogen 0.1 part each of benzoyl peroxide and α:α′-azoisobutyro-dinitrile are added. At intervals of 2 hours each another 9 additions of these amounts of catalyst are made, and 2 hours after the last addition the mixture is cooled to room temperature.

A clear resin solution of claret color and low viscosity results from which water precipitates the resin immediately. The yield of polymer amounts to 90 to 91% of the theoretical, the content of dry resin amounting to 36–37%.

The phosphoric acid salt is soluble in water in a concentration of one percent by weight and can be used as hair setting lotion in the same way as described in Example 3.

6 parts of the solution described above are diluted with 14 parts of absolute ethanol and neutralized with 0.1 part of phosphoric acid of 100% strength. This solution is cooled to −5° to −10° C., charged into an aerosol dispenser, 30 parts of a mixture of equal parts of monofluorotrichloromethane and dichloro-difluoromethane are added, and the dispenser is closed with a special valve for hair setting lotions. The aerosol spray thus obtained is suitable as a hair setting lotion.

*Example 8*

When the mixture according to Example 2 is replaced by a mixture of 72 parts of tertiary butylacrylamide, 36 parts of octadecyl acrylamide, 12 parts of N-diethylamino-ethyl-α-chloracrylamide and 180 parts of isopropanol, proceeding otherwise as described in Example 2, there are obtained 300 parts of a similar resin solution having a content of dry resin of about 39 to 40%.

5 parts of the above resin solution of about 40% strength are diluted with 15 parts of isopropanol and neutralized with 0.28 part of stearic acid. The solution is cooled to —5° to —10° C., and 30 parts of a mixture of equal parts of monofluoro-trichloromethane and dichloro-difluoromethane are added. This mixture is charged into an aerosol dispenser closed with a gastight special valve for hair setting lotions. Hair sprayed with this aerosol preparation has properties similar to those described in Example 2.

*Example 9*

A mixture of 37.5 parts of tertiary butylacrylamide, 12.5 parts of para-dimethylaminophenyl-acrylamide quaternated with dimethyl sulfate and 75 parts of absolute ethanol is heated in a stirring flask fitted with reflux condenser and thermometer to an internal temperature of about 78° C., whereupon 0.1 part each of benzoyl peroxide and α:α'-azoisobutyro-dinitrile are added, and this addition of catalyst is repeated 4 more times at intervals of 2 hours each. 2 hours after the last addition the whole is cooled to room temperature.

A dark-colored highly viscous solution is obtained which, on addition of a small amount of water, first forms an emulsion and can then be diluted with water in any proportion, a colloidal solution being thus obtained.

The yield of polymer amounts to about 99% of the theoretical, the content of dry resin being 43 to 44%.

5 parts of the above-described resin solution are diluted with 15 parts of absolute ethanol and cooled to —5° to —10° C. This solution is charged into an aerosol dispenser, 30 parts of a mixture of equal parts of monofluoro-trichloromethane and dichloro-difluoromethane are added, and the dispenser is closed with a special valve for hair setting lotions.

A hair setting spray is obtained having properties similar to those described in Example 1.

*Example 10*

When the mixture described in Example 9 is replaced by a mixture containing 25 parts of ethylacrylate, 15 parts of tertiary butylacrylamide, 10 parts of dimethylamino-phenyl-acrylamide quaternated with dimethyl sulfate and 75 parts of absolute ethanol, proceeding otherwise as described in Example 9, a product having similar properties is obtained. The yield of polymer is about 99% of the theoretical, the dry resin content being about 74%.

4.25 parts of the resin solution described above are diluted with 15.75 parts of absolute ethanol and cooled to —5° to —10° C. This solution is charged into an aerosol dispenser, 30 parts of a mixture of equal parts of monofluoro-trichloromethane and dichloro-difluoromethane are added, and the dispenser is closed with a special valve for hair setting lotions.

A hair spray is obtained having properties similar to those described in Example 1.

*Example 11*

A mixture of 35 parts of N-(γ-diethylaminopropyl)-acrylamide quaternated with triethyl phosphite and 35 parts of N-cyclohexyl-N-(γ-hydroxypropyl)-acrylamide is heated with a solution of 3.5 parts of lauroylamidopropyl trimethylammonium methosulfate in 105 parts of distilled water and 0.1 part of isooctanol in a stirring flask fitted with reflux condenser and thermometer under nitrogen to an internal temperature of about 65° C., whereupon 0.05 part of potassium persulfate in 5 parts of water are added. After 45 minutes the internal temperature is raised to 75° C. and at intervals of 2 hours each three further additions each of 0.05 part of potassium persulfate in 5 parts of water are made, and 2 hours after the last addition of catalyst the mixture is cooled to room temperature.

A thinly liquid emulsion is obtained having a good degree of dispersion. The yield of polymer is about 93 to 94% of the theoretical, the dry resin content being 39 to 40%.

5.5 parts of the resin solution described above are diluted with 14.5 parts of absolute ethanol and cooled to —5° to —10° C. This solution is charged into an aerosol dispenser, 30 parts of a mixture of equal parts of mono-fluoro-trichloromethane and dichloro-difluoromethane are added, and the dispenser is closed with a special valve for hair setting lotions.

A hair spray is obtained having properties similar to those described in Example 1.

*Example 12*

A mixture of 36 parts of tertiary butylacrylamide, 4 parts of N-(β-diethylaminoethyl)-methacrylate and 60 parts of absolute ethanol is heated in a stirring flask provided with reflux condenser and thermometer to an internal temperature of about 75° C., whereupon 0.05 part each of α:α'-azoisobutyro-dinitrile and lauroyl peroxide are added. After about 15 minutes the temperature has risen by about 3° C. At intervals of 2 hours each nine further additions are made of 0.05 part each of α:α'-azoisobutyro-dinitrile and lauroyl peroxide, and after the last addition polymerization is carried on for a further 2 hours.

A thinly viscous yellowish brown solution is obtained from which the resin precipitates immediately when water is added. The yield of polymer amounts to about 93% of the theoretical, the dry content being 38 to 40%.

5 parts of the solution described above, having a resin content of about 40%, are diluted with 200 parts of water and neutralized with 0.32 part of acetic acid of 100% strength. The solution can be used as aqueous hair setting lotion as described in Example 3.

5 parts of the same resin solution are diluted with 15 parts of absolute ethanol and neutralized with 0.32 part of acetic acid of 100% strength. This solution is cooled to —5° to —10° C. and charged into an aerosol dispenser. There are then added 30 parts of a mixture of equal parts of monofluorotrichloromethane and dichloro-difluoromethane and the container is closed with a special valve for hair setting lotions. Hair sprayed with this aerosol hair setting lotion has a fine lustre, is easy to dress and no longer displays the unpleasant effects of a charge of static electricity. The dried lotion is readily soluble in water.

The thinly viscous alcoholic resin solution described above is neutralized with acetic acid. The resin, which is now water-soluble, is diluted with water to form an impregnating liquor. A polyamide fiber (nylon) is impregnated with this liquor on a padder, squeezed and dried in a manner such that 0.5% of the resin, calculated on the weight of the fabric, remains on the latter. The polyamide fabric treated in this manner has good anti-static properties.

*Example 13*

15 parts of diethylaminoethyl crotonate are neutralized with 4.87 parts of acetic acid of 100% strength and then diluted with 150 parts of symmetrical dichloro-ethane. 45 parts of tertiary butylacrylamide and 40 parts of ethyl-acrylate are added and the mixture is heated in a stirring flask fitted with reflux condenser and thermometer in a current of nitrogen to an internal temperature of about 70 to 73° C., whereupon 0.05 part each of lauroyl peroxide and α:α'-azoisobutyro-dinitrile are added. After 15 minutes the temperature has risen by 11° C. and then gradually drops again to the initial value; when this point has been reached, another 0.05 part each of lauroyl peroxide and α:α′-azoisobutyro-dinitrile are added and the same addition is made another 8 times every 2 hours. 2 hours after the addition of the last portion of catalyst the mixture is cooled to room temperature.

The yield of polymer, which is present in the form of the acetate salt, amounts to about 92% of the theoretical, the dry content being 38 to 40%. The salt is soluble in water in a concentration of 1 percent.

*Example 14*

50 parts of (di-diethylaminoethyl)-fumaric acid ester quaternated with dimethyl sulfate and 50 parts of isobornyl-acrylamide are suspended in a solution of 5 parts of lauroyl-amidopropyl trimethylammonium methosulfate in 100 parts of water and 0.2 part of isooctanol. One half of this suspension is heated in a stirring flask fitted with reflux condenser, dropping funnel and thermometer in a current of nitrogen to an internal temperature of 65° C. 0.1 part of potassium persulfate in 10 parts of water is added and in the course of 40 minutes the remainder of the suspension, after it has been mixed with a solution of 0.2 part of potassium persulfate in 20 parts of water, is stirred in portionwise. Another 0.1 part of potassium persulfate in 10 parts of water is added, and after a further hour the same amount of catalyst is once more added. After another hour the emulsion thus formed is cooled to room temperature. The yield of polymer is about 100% of the theoretical, the content of dry resin amounting to about 43%.

When the emulsion descriped above is heated at 70° C. in vacuo it yields the dry resin.

2 parts of this dry resin are dissolved in 18 parts of ethanol and cooled to —5° to —10° C. This solution is charged into an aerosol dispenser, 30 parts of a mixture of equal parts of monofluoro-trichloromethane and dichloro-difluoromethane are added, and the dispenser is closed with a special valve.

The resulting aerosol preparation is sprayed on the hair and imparts a very strong lustre to the hair.

*Example 15*

A solution of 35.1 parts of N-diethylaminoethylmethacrylate quaternated with triethyl phosphite and 35.1 parts of di-oxyethyl methacrylamide in 145.1 parts of distilled water is heated in a stirring flask fitted with reflux condenser and thermometer in a current of nitrogen to an internal temperature of 65° C., whereupon 0.04 part of potassium persulfate in 4 parts of water are added. At intervals of 1 hour each another 3 additions of the same amount of catalyst are made, whereupon the internal temperature is raised to 90° C. and another 0.04 part of potassium persulfate in 4 parts of water are added. After another 2 hours the mixture is cooled to room temperature, and the solution is filtered in a pressure filter through a layer of a special clarifying filter assistant.

A completely clear yellow solution is obtained. The yield of polymer is about 90% of the theoretical, the content of dry resin amounting to about 28%.

8 parts of the resin solution are dissolved in 12 parts of isopropanol and cooled to —5° to —10° C. This solution is charged into an aerosol dispenser, 30 parts of a mixture of equal parts of monofluoro-trichloromethane and dichloro-difluoromethane are added, and the dispenser is closed with a special valve.

The resulting aerosol preparation is sprayed on the hair and imparts a very strong lustre to the hair.

*Example 16*

A mixture of 30 parts of N-morpholyl ethylacrylate and 30 parts of di-n-butylacrylamide is emulsified in a solution of 3 parts of lauroylamidopropyl trimethylammonium methosulfate in 90 parts of distilled water and 0.1 part of isooctanol, and 16 parts of phosphoric acid of 100% strength are added to the emulsion. The whole is heated in a stirring flask provided with reflux condenser and thermometer under nitrogen to an internal temperature of about 65° C., and 0.04 part of potassium persulfate in 4 parts of water are added. Within 20 minutes the temperature rises to about 76° C., and after it has dropped to 65° C. another identical amount of catalyst is added. After the temperature has again risen to about 70° C. and then dropped to 65° C. another 0.04 part of potassium persulfate in 4 parts of water are added, and after 45 minutes the internal temperature is raised to about 75° C. As soon as this temperature has been reached, another 0.04 part of potassium persulfate in 4 parts of water are added, and another identical amount of catalyst is added after another hour. After another hour the mixture is cooled to room temperature.

A thickly sirupy emulsion having a good degree of dispersion is obtained. The yield of polymer, which is present in the form of the phosphoric acid salt, amounts to 97 to 98% of the theoretical, the content of dry resin being about 42%. The salt is soluble in water in a concentration of 1 percent.

I claim:

1. An aerosol preparation for the treatment of the hair consisting essentially of hydrophilic salt of basic copolymer in solution in a mixture of water-soluble alkanol with 1 to 3 carbon atoms and fluorochloroalkane propellant, said basic copolymer being the product of the copolymerization of (a) a compound of the formula

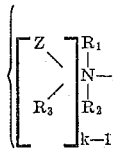 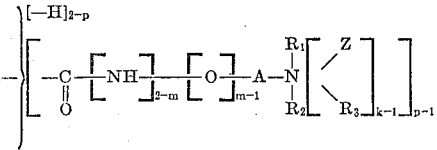

in which A is an unsubstituted hydrocarbon radical which constitutes a bridge of two to six carbon atoms between the hetero atoms, R is the divalent monoethylenically unsaturated hydrocarbon radical of an acid selected from the group consisting of acrylic acid, methacrylic acid, crotonic acid, maleic acid and fumaric acid, $R_1$ and $R_2$ each is alkyl with 1 to 4 carbon atoms, $R_3$ is the monovalent organic radical resulting from quaternization with a quaternizing agent selected from the group consisting of dimethylsulfate, ethylbromide, ethyliodide, benzylchloride, toluene sulfonic acid lower alkyl ester, epichlorhydrin, chloracetamide, N-methylolchloracetamide and triethylphosphite, Z is the anion resulting from said quaternizing agent, and $k$, $m$ and $p$ each is a whole positive number of at most 2, and (b) an N-substituted acrylamide of the formula

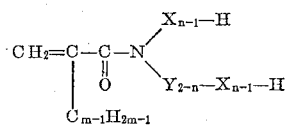

in which X is a divalent saturated hydrocarbon radical containing 1 to 8 carbon atoms, Y is a divalent saturated hydrocarbon radical with 3 to 10 carbon atoms, and $m$ and $n$ each is a positive whole number of at the most 2.

2. An aerosol preparation for the treatment of the hair consisting essentially of hydrophilic salt of basic copolymer in solution in a mixture of water-soluble alkanol with 1 to 3 carbon atoms and fluorochloroalkane propellant, said basic copolymer being the product of the copolymerization of
(a) a compound of the formula

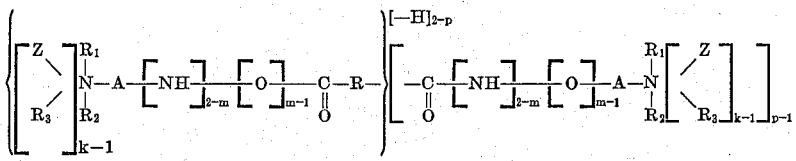

in which A is an unsubstituted hydrocarbon radical which constitutes a bridge of two to six carbon atoms between the hetero atoms, R is the divalent monoethylenically unsaturated hydrocarbon radical of an acid selected from the group consisting of acrylic acid, methacrylic acid, crotonic acid, maleic acid and fumaric acid, $R_1$ and $R_2$ each is alkyl with 1 to 4 carbon atoms, $R_3$ is the monovalent organic radical resulting from quaternization with a quaternizing agent selected from the group consisting of dimethylsulfate, ethylbromide, ethyliodide, benzylchloride, toluene sulfonic acid lower alkyl ester, epichlorhydrin, chloracetamide, N-methylolchloracetamide and triethylphosphite, Z is the anion resulting from said quaternizing agent, and $k$, $m$ and $p$ each is a whole positive number of at most 2, (b) an N-substituted acrylamide of the formula

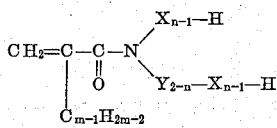

in which X is a divalent saturated hydrocarbon radical with 1 to 8 carbon atoms, Y is a divalent saturated hydrocarbon radical with 3 to 10 carbon atoms, and $m$ and $n$ each is a positive whole number of at the most 2, and (c) another, at least copolymerizable, ethylenically unsaturated compound.

3. An aerosol preparation for the treatment of the hair, consisting essentially of hydrophilic salt of copolymer of (a) N-(γ-diethylaminopropyl)-acrylic amide and (b) acrylic acid N-tertiary-butylamide in solution in a mixture of water-soluble alkanol with 1 to 3 carbon atoms and fluorochloroalkane propellant.

4. An aerosol preparation for the treatment of the hair, consisting essentially of hydrophilic copolymer of (a) quaternized N-(γ-diethylaminopropyl)-acrylic acid amide and (b) acrylic acid N-tertiary-butylamide, in solution in a mixture of water-soluble alkanol with 1 to 3 carbon atoms and fluorochloroalkane propellant.

5. An aerosol preparation for the treatment of the hair, consisting essentially of hydrophilic copolymer of (a) quaternized N-(γ-diethylaminopropyl)-acrylic acid amide, (b) acrylic acid N-tertiary-butylamide and (c) an ester of acrylic acid with alkanol, in solution in a mixture of water-soluble alkanol with 1 to 3 carbon atoms and fluorochloroalkane propellant.

6. An aerosol preparation for the treatment of the hair, consisting essentially of hydrophilic copolymer of (a) quaternized N-(γ-diethylaminopropyl)-acrylic acid amide, (b) acrylic acid tertiary-octylamide and (c) an ester of acrylic acid with alkanol, in solution in a mixture of water-soluble alkanol with 1 to 3 carbon atoms and fluorochloroalkane propellant.

7. An aerosol preparation for the treatment of the hair, consisting essentially of hydrophilic salt of copolymer of (a) p-dimethylaminophenyl-acrylamide and (b) acrylic acid di-n-butylamide, in solution in a mixture of water-soluble alkanol with 1 to 3 carbon atoms and fluorochloroalkane propellant.

8. An aerosol preparation for the treatment of the hair, cosisting essentially of hydrophilic copolymer of (a) quaternized p-dimethylaminophenylacrylamide, (b) acrylic acid tertiary-butylamide, and (c) an ester of acrylic acid with lower alkanol, in solution in a mixture of a water-soluble alkanol with 1 to 3 carbon atoms and fluorochloroalkane propellant.

9. An aerosol preparation for the treatment of the hair, consisting essentially of hydrophilic salt of copolymer of (a) N-(β-diethylaminoethyl)-methacrylate and (b) acrylic acid tertiary-butylamide, in solution in a mixture of water-soluble alkanol with 1 to 3 carbon atoms and fluorochloroalkane propellant.

10. An aerosol preparation for the treatment of the hair, consisting essentially of hydrophilic salt of copolymer of (a) N-(β-diethylaminoethyl)-methacrylate, (b) acrylic acid tertiary-butylamide and (c) an ester of acrylic acid with lower alkanol, in solution in a mixture of water-soluble alkanol with 1 to 3 carbon atoms and fluorochloroaklane propellant.

11. An aerosol preparation for the treatment of the hair, consisting essentially of hydrophilic copolymer of (a) quaternized N-(β-diethylaminoethyl)-methacrylate and (b) acrylic acid tertiary-butylamide, in solution in a mixture of water-soluble alkanol with 1 to 3 carbon atoms and fluorochloroalkane propellant.

12. An aerosol preparation for the treatment of the hair, consisting essentially of hydrophilic salt of copolymer of (a) (di-ethylaminoethyl)-fumaric acid di-ester and (b) acrylic acid di-n-butylamide, in solution in a mixture of water-soluble alkanol with 1 to 3 carbon atoms and fluorochloroalkane propellant.

13. An aerosol preparation for the treatment of hair comprising, as solvent, a water-soluble lower alkanol, a propellant, and in solution in a mixture of said solvent and propellant, a hydrophilic salt of a basic copolymer, said copolymer being the copolymer of
(a) a compound of the formula

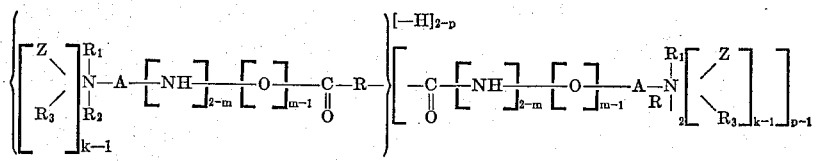

in which A is an unsubstituted hydrocarbon radical which constitutes a bridge of two to six carbon atoms between the hetero atoms, R is the divalent monoethylenically unsaturated hydrocarbon radical of an acid selected from the group consisting of acrylic acid, methacrylic acid, crotonic acid, maleic acid and fumaric acid, $R_1$ and $R_2$ each is alkyl with 1 to 4 carbon atoms, $R_3$ is the monovalent organic radical resulting from quaternization with a quaternizing agent selected from the group consisting of dimethylsulfate, ethylbromide, ethyliodide, benzylchloride, toluene sulfonic acid lower alkyl ester, epichlorhydrin, chloracetamide, N - methylolchloracetamide and triethylphosphite, Z is the anion resulting from said quaternizing agent, and $k$, $m$ and $p$ each is a whole positive number of at most 2, and (b) an N-substituted acrylamide of the formula

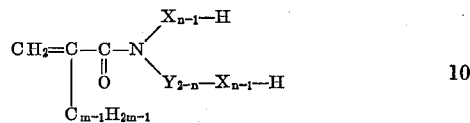

in which X is a divalent saturated hydrocarbon radical with 1 to 8 carbon atoms, Y is a divalent saturated hydrocarbon radical with 3 to 10 carbon atoms, and $m$ and $n$ each is a positive whole number of at the most 2.

14. An aerosol preparation for the treatment of hair comprising, as solvent, a water-soluble lower alkanol, a propellant, and in solution in a mixture of said solvent and propellant, a hydrophilic salt of a basic copolymer, said copolymer being the copolymer of (a) a compound of the formula

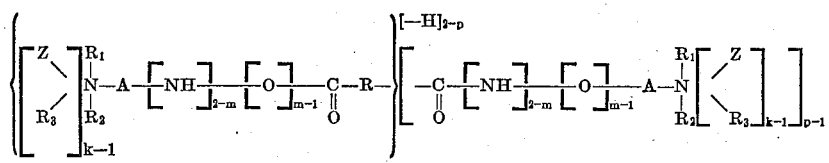

in which A is an unsubstituted hydrocarbon radical which constitutes a bridge of two to six carbon atoms between the hetero atoms, R is the divalent monoethylenically unsaturated hydrocarbon radical of an acid selected from the group consisting of acrylic acid, methacrylic acid, crotonic acid, maleic acid and fumaric acid, $R_1$ and $R_2$ each is alkyl with 1 to 4 carbon atoms, $R_3$ is the monovalent organic radical resulting from quaternization with a quaternizing agent selected from the group consisting of dimethylsulfate, ethylbromide, ethyliodide, benzylchloride, toluene sulfonic acid lower alkyl ester, epichlorhydrin, chloracetamide, N - methylolchloracetamide and triethylphosphite, Z is the anion resulting from said quaternizing agent, and $k$, $m$ and $p$ each is a whole positive number of at most 2, (b) an N-substituted acrylamide of the formula

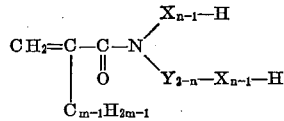

in which X is a divalent saturated hydrocarbon radical with 1 to 8 carbon atoms, Y is a divalent saturated hydrocarbon radical with 3 to 10 carbon atoms, and $m$ and $n$ each is a positive whole number of at the most 2, and (c) another, at least copolymerizable, ethylenically unsaturated compound.

References Cited by the Examiner
FOREIGN PATENTS
864,311    4/1961    Great Britain.

JULIAN S. LEVITT, *Primary Examiner*.